United States Patent [19]

Yohda

[11] Patent Number: 5,065,267

[45] Date of Patent: Nov. 12, 1991

[54] MULTI-TRACK MAGNETIC HEAD HAVING DIFFERENT HEIGHT HEAD CHIPS

[75] Inventor: Hiroshi Yohda, Hirakata, Japan

[73] Assignee: Matsushita Electric Industrial Co., Ltd., Osaka, Japan

[21] Appl. No.: 554,928

[22] Filed: Jul. 20, 1990

[51] Int. Cl.⁵ .................. G11B 5/48; G11B 21/16; G11B 15/60

[52] U.S. Cl. .................. 360/104; 360/130.24; 360/121; 360/84; 360/109

[58] Field of Search .............. 360/76, 109, 107, 108, 360/104, 84, 130.22, 130.24, 121, 124, 129, 125

[56] References Cited

U.S. PATENT DOCUMENTS

| | | | |
|---|---|---|---|
| 4,497,005 | 1/1985 | Heinz | 360/109 X |
| 4,713,710 | 12/1987 | Soda et al. | 360/121 |
| 4,894,736 | 1/1990 | Orton | 360/121 |
| 4,897,745 | 1/1990 | Binder-Kriegelstein | 360/109 X |

FOREIGN PATENT DOCUMENTS

| | | | |
|---|---|---|---|
| 58-159207 | 9/1983 | Japan | 360/130.24 |
| 59-193517 | 2/1984 | Japan | 360/121 |
| 59-87620 | 5/1984 | Japan | 360/121 |
| 61-120314 | 6/1986 | Japan | 360/124 |
| 61-261810 | 11/1986 | Japan | 360/130.24 |
| 62-239311 | 10/1987 | Japan | 360/130.24 |
| 62-239312 | 10/1987 | Japan | 360/130.24 |
| 62-279501 | 12/1987 | Japan | 360/76 |
| 63-46616 | 2/1988 | Japan | 360/109 |
| 63-138615 | 9/1988 | Japan . | |
| 63-220407 | 9/1988 | Japan | 360/76 |
| 0013809 | 1/1989 | Japan | 360/130.24 |
| 1-159821 | 6/1989 | Japan | 360/76 |
| 1-263906 | 10/1989 | Japan | 360/76 |
| 8806333 | 8/1988 | PCT Int'l Appl. | 360/84 |

Primary Examiner—Aristotelis Psitos
Assistant Examiner—Alfonso Garcia
Attorney, Agent, or Firm—Stevens, Davis, Miller & Mosher

[57] ABSTRACT

The multi-track head includes more than one head chip attached onto one head base. The head chips are respectively attached onto the divided front end parts of the head base, and the relative positions of the front end parts of the head base are adjusted so that the positions of the gap ends in the head chips are set precisely to a predetermined value, before the head chips are fixed. For these reasons, it is not necessary to adjust the position of each head chip after the head chips are arranged in a rotary cylinder. It is therefore possible to obtain a head having a size which can be accurately adjusted, regardless of the size of the head chip, even when the head chip is extremely small. A bonding material is provided between the divided front end parts to secure the front end parts and the chips mounted thereon in place after they have been displaced to align them with recording medium track locations.

2 Claims, 4 Drawing Sheets

MULTI-TRACK MAGNETIC HEAD HAVING DIFFERENT HEIGHT HEAD CHIPS

BACKGROUND OF THE INVENTION

1. Field of the Invention

The present invention relates to a multi-track magnetic head suitable for recording and reproducing high rate signals.

2. Description of the Related Art

To record and reproduce broad-band signals from media such as high quality video tape recorders (VTRs) or digital VTRs, research on increasing the relative speeds between tapes and heads and on multi-channeling have been underway. According to conventional analog recording, in the case of multi-channel recording, it is required that track positions among heads (a distance from a head base to gap ends specifying signal positions recorded on a tape by the heads) and that gap intervals be extremely accurate. High accuracy, however, is not so much required in terms of the gap intervals, since it is possible for digital recording to digitally process reproduced signals. Multi-channel recording is thus permitted by such a plurality of head chips bonded to one head base.

In the case that a plurality of head chip are installed on one head base, in order to attain stable contact with a tape, it is recommended that the head chip intervals be as small as possible. However, if the width of a head chip is narrow, it is extremely difficult, from the viewpoint of accuracy in installing the head chips and the adjusting screws, to adjust the track position of each of the head chips, as has been done conventionally, with the use of adjusting screws protruding from a rotary cylinder. In light of the above, a magnetic head device is proposed in which a plurality of head chips are installed onto a head base where slits are formed, and the track positions between the head chips can be adjusted, with extremely small screws on the head base (see to Japanese Utility Model Unexamined Publication No. 63-138615). In the case of, for example, a head chip having a width of 0.5 mm, however, it would be difficult to manufacture the magnetic head device in terms of machining, even though the head base is tapered and widened and the interval between the adjusting screws is set to 1 mm. Furthermore, when adjustment to the track position is made on the head base, there is a disadvantage in that a good stability cannot be obtained after the adjustment, because the strength of a part serving as a criterion is lower, as compared with the case where a screw protruding from the rotary cylinder is a standard.

SUMMARY OF THE INVENTION

In order to overcome the above-described problem, one object of the present invention is to provide a magnetic head comprising a head attaching base including a plurality of divided front end parts, a plurality of head chips attached to the front end parts of the head base, the front end parts of the head base being joined to each other so that the track positions between the head chips are set to determined values after the positions of the front end parts of the head base are changed.

With the head according to the present invention, in order to adjust the track positions of the adjacent head chips, the positions of the front end parts of the head base are changed with a tool, such as a position adjusting pin, which is not associated with the head base, before the adjacent front end parts of the head base are joined to each other. Because of this joining, it is possible to provide a multi-track head in which the track positions between heads are precisely adjusted, with respect to the head base, without utilizing a position adjusting means, such as a screw. According to such a construction as mentioned above, even through a plurality of extremely narrow head chips having a width of 0.5 mm or less are installed onto the head base, the use of exceedingly small-shaped heads is possible because the size of the screws or the like does not restrict the head shape, and therefore excellent sliding conditions between the heads and a tape can be obtained.

Other features and advantages of the present invention will be apparent from the following description taken in conjunction with the accompanying drawings, in which like reference characters designate like parts throughout the drawings.

BRIEF DESCRIPTION OF THE DRAWINGS

FIGS. 2 through 6 are views showing a manufacturing method for the head in accordance with the invention; in which FIGS. 4 and 5 are views showing the front ends of the head illustrated in FIG. 3 as viewed in the direction indicated by an arrow A;

DESCRIPTION OF THE PREFERRED EMBODIMENTS

Figure 1:
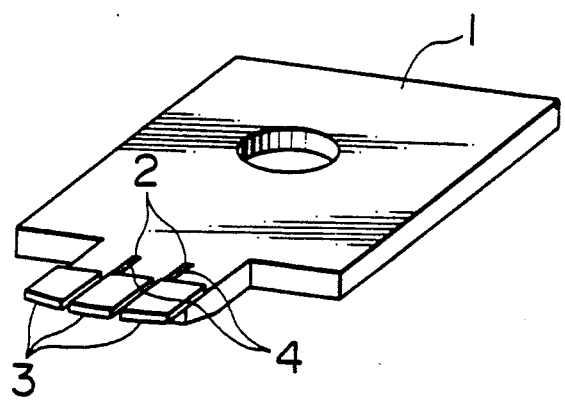
FIG. 1 is a perspective view illustrating an embodiment of a head according to the present invention.
Figure 2:
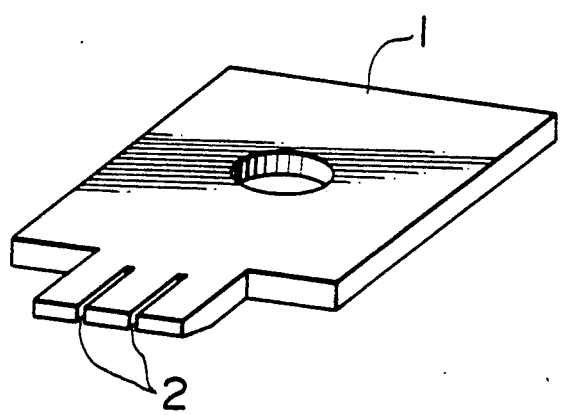

An embodiment of a magnetic head according to the present invention will be hereinafter described with reference to FIG. 1, which is a perspective view of a multi-track head in which three head chips are attached to a head base. Grooves 2 are formed in the front end section of the head base 1 to which the head chips 3 are attached. The head base 1 is made of metal such as brass, or ceramics such as alumina, and the grooves 2 divide the front end section into parts to which the head chips 3 are attached respectively. Head chip 3 has, for example, a width of 0.6 mm, a height of 2 mm, and a thickness of 0.2 mm, and the head chips 3 are respectively bonded to the front end parts of the head base 1 which are divided by the grooves 2. A bonding agent corresponding to head base materials, such as a solder paste, low melting point glass or epoxy resin, is filled in the grooves 2 so as to fix the positions of the front end parts of the head base 1. The bonding agent is filled in the grooves 2, with the front end parts of the head base 1, which are divided by the grooves 2, slightly shifted away from each other so that the track position of each head chip 3 is set to a predetermined value. According to such an arrangement as described above, since it is possible to make the width of the groove 0.1 mm or less, a highly accurate multi-track head can be obtained, without providing a complex head position adjusting system in the head base, even for a head to which a plurality of extremely small head chips, each having a width of not more than 1 mm, are attached.

Figure 3:
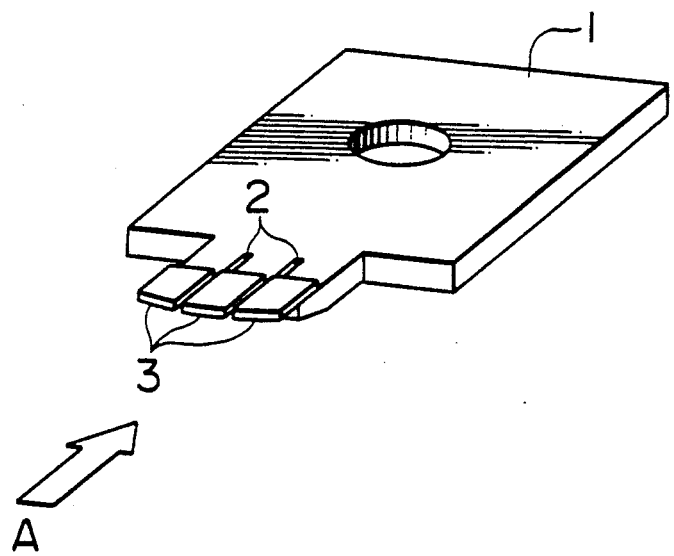
Figure 4:
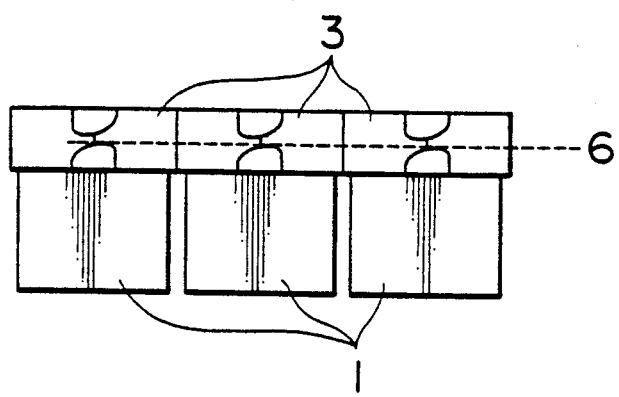
Figure 5:
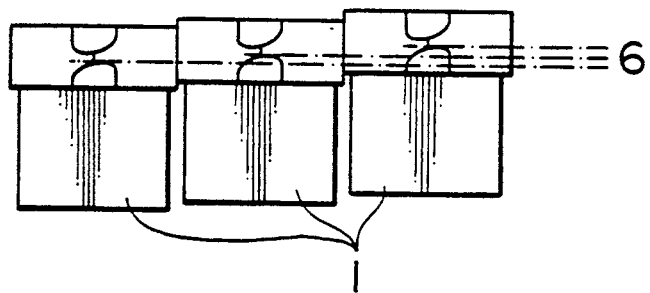
Figure 6:
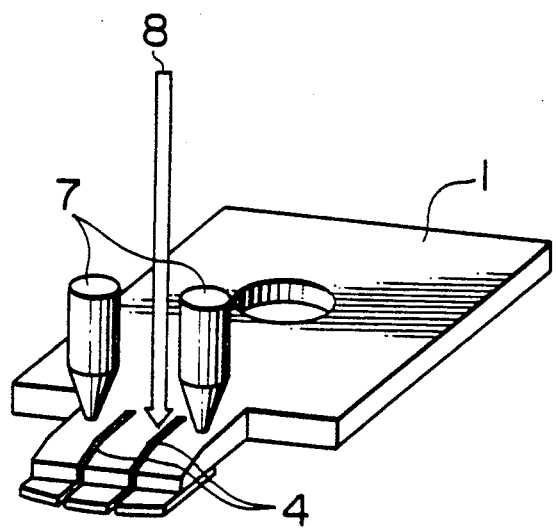

The manufacturing method for the magnetic head according to the present invention will now be described with reference to FIG. 2 to FIG. 6. The grooves 2, corresponding to the number of head chips installed to the front end parts of the head base 1, are formed in the front ends of the brass head base 1. As illustrated in FIG. 3, the head chips 3 are each respectively bonded to one of the divided front end parts of the head base 1. FIGS. 4 and 5 show the shapes of the front end parts as viewed in the direction indicated by an arrow A in FIG. 2. The track position of each of the head chips 3 has a tolerance of several μm with respect to a desired value due to machining and bonding of the chips. For this reason, pressure is applied from the outside to adjust the track positions to desired track positions as shown in FIG. 5. For clarification purposes, FIG. 4 illustrates an example in which the dimensions from the tips of the head chips to the ends of the gaps are equal. It is easy in practice to set the adjusting distance in a range of several μm by adjusting the machining size of the chip or by altering the thickness of the front end parts of the head base. As shown in FIG. 6, in the actual process, an adjustment is made by using pins 7 so as to press the front end of the head base until the head track position of the head chips on both sides arrives at the desired portion, with respect to the center head chip. Under these conditions, a solder paste poured into the grooves 2 is heated and fused by a laser beam 8, and then the laser beam 8 is stopped so as to be cooled and solidified. By repeating these processes successively, it is possible to adjust the tracks of the head chips 3 on the head base 1 to be set at desired positions. FIG. 6 illustrates a view in which the above adjustment is made by using two pins 7; only one pin, however, is enough when the positions are adjusted successively with respect to a reference head. A head, chip having a small width which can be pressed by a pin can be adjusted. It is therefore possible to handle very small head chips, as compared with a conventional case where the adjustment is made by screws or the like arranged on the head base.

Figure 7:
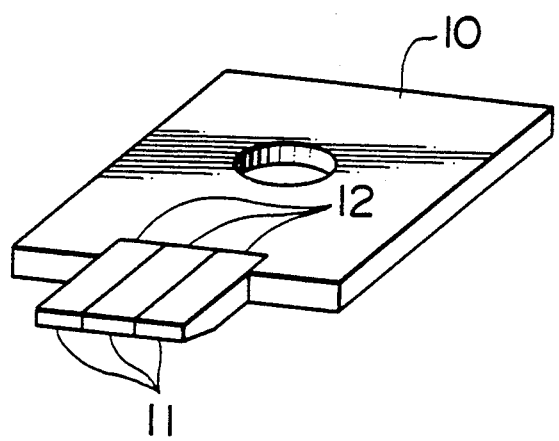
FIG. 7 is a perspective view illustrating a second embodiment of the head according to the present invention.

It has been explained that soldering is fused by the laser beam 8 in the above-mentioned embodiment. As bonding agents in the groove 2 in combination with head base materials, metals having a relatively low melting point such as zinc cu-Ag or the like and organic bonding agents such as epoxy resin cyanoacrylate or the like, can be used. The above organic bonding agent or glass is valid for ceramics such as alumina, or crystallized glass. Further, as fusing means other than a laser beam, arc discharge, heating by introducing electric current or the like may also be applied. Furthermore, as shown in FIG. 7, the front end parts of a head may be directly welded to each other after the front ends 11 of a head base 10 being joined at interfaces 12 to the head base 10, instead of the above-mentioned structure in which the front end parts of the head base are formed by cutting grooves.

Figure 8:
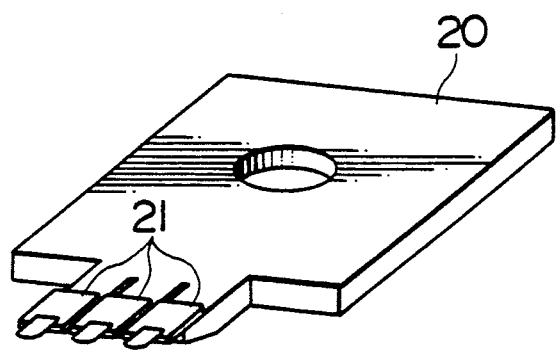
FIGS. 8 and 9 are perspective views illustrating intermediate bases in the second embodiment of the invention.
Figure 9:
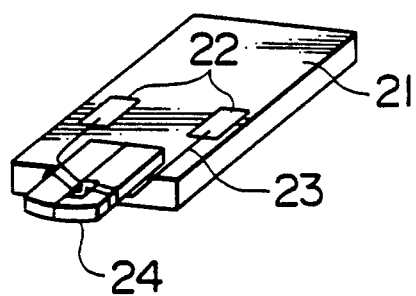

A second embodiment of the present invention will be hereinafter described with reference to Figs. 8 and 9. Intermediate bases 21 as illustrated in FIG. 9 are bonded to the divided front ends of a head base 20. A head chip 24 is bonded to the tip of the intermediate base 21, and terminals 22 to which a head winding is connected are disposed on the surface of the intermediate base 21. The track positions of the head chips are adjusted and fixed in the same manner as that described in the first embodiment. Before the head chip 24 is bonded to the head base 21 if the head chip 24 is bonded to the intermediate base 21 and wound thereon with the winding 23, and the characteristics of the head chip 24 are evaluated, the multi-channel head can be easily manufactured, because selecting chips which meet characteristics as required and using them as parts of heads are permitted. Moreover, even when the positions to which the heads are bonded on the head base are adjusted, holding the intermediate base 21 provides firm treatment of the heads, since the intermediate base 21 has a large area, and thus it is unlikely that the head chips will be damaged during the adjustment.

Various other forms of the present invention can be devised without departing from the spirit and scope thereof and accordingly it is to be understood that the invention is not limited to the above-mentioned specific embodiments thereof but should be limited only by the appended claims.

What is claimed is:

1. A magnetic head comprising:
   a head base including a plurality of divided front end parts;
   a plurality of head chips respectively attached to the divided front end parts of said head base, said head base and said head chips attached thereto providing a front end surface of said magnetic head, said chips being positioned on said head base so as to be aligned respectively along a plurality of track directions, said track directions being adapted to be aligned with tracks on a recording medium traveling along said front surface, said divided front end parts being oriented lengthwise of said track directions, said plurality of head chips being displaceable relative to each other by bending said divided front end parts transversely relative to said track directions: and
   a bonding material located between said plurality of divided front end parts to secure said divided front end parts relative to each other after they have been displaced relative to each other so as to align said plurality of head chips respectively with said track directions, whereby said head chips are held in accurate alignment with said tracks on the recording medium.

2. A magnetic head according to claim 1, wherein the head chips are attached to said divided front end parts of said head base respectively through intermediate bases having electrodes which are terminals of a head winding.

* * * * *